E. F. HARTSHORN.
SPEAR FOR SPRING SHADE ROLLERS.
APPLICATION FILED JUNE 25, 1910.
1,039,938.
Patented Oct. 1, 1912.
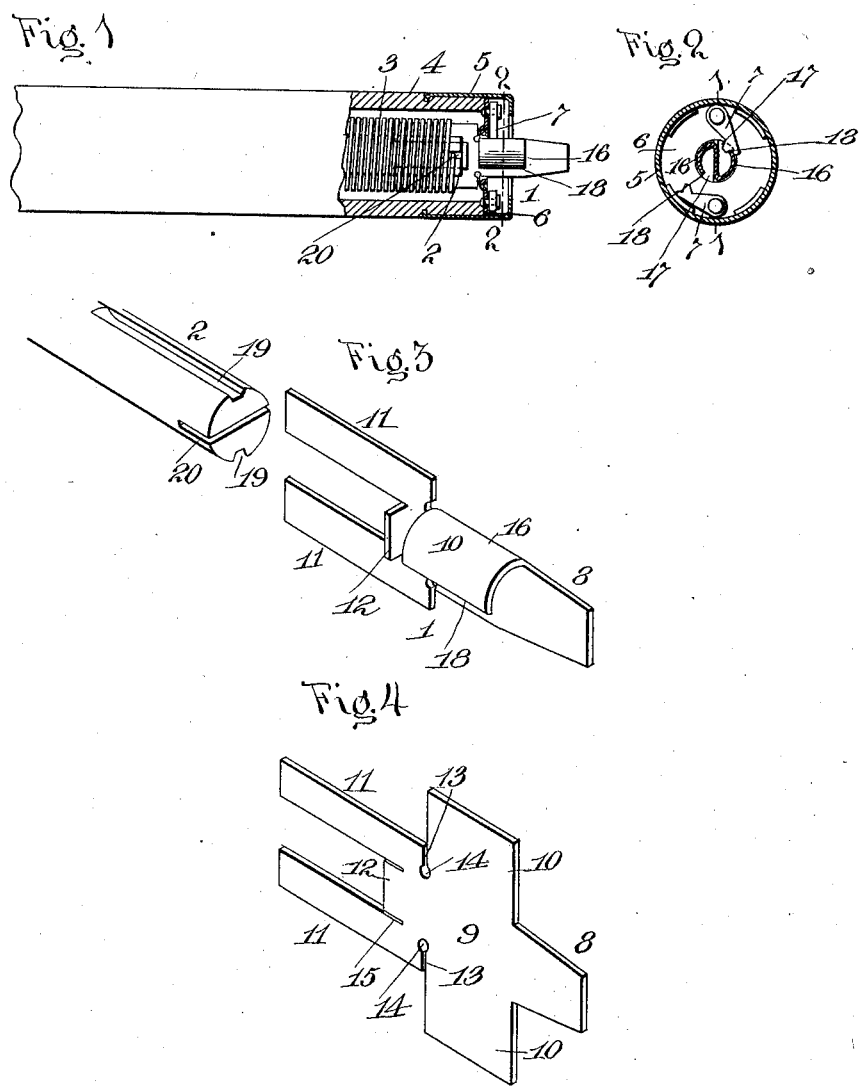

UNITED STATES PATENT OFFICE.

EDMUND F. HARTSHORN, OF NEWARK, NEW JERSEY, ASSIGNOR TO STEWART HARTSHORN COMPANY, OF EAST NEWARK, NEW JERSEY, A CORPORATION OF NEW JERSEY.

SPEAR FOR SPRING SHADE-ROLLERS.

1,039,938.   Specification of Letters Patent.   Patented Oct. 1, 1912.

Application filed June 25, 1910. Serial No. 568,763.

*To all whom it may concern:*

Be it known that I, EDMUND F. HARTSHORN, a citizen of the United States of America, residing in Newark, county of Essex, State of New Jersey, have invented a certain new and useful Spear for Spring Shade-Rollers, of which the following is a specification.

The objects I have in view are the production of a cheap and efficient spear for spring shade rollers, to take the place of the usual malleable casting now employed for the purpose. By my invention I reduce the cost by employing a cheaper material and less of it, and also reduce the weight and make the attachment to the spindle cheaper and surer. These and further objects will appear from consideration of the embodiment of my invention set forth in the following specification and accompanying drawings, considered together or separately.

In the drawing, Figure 1 is a side view, partly in section, on the line 1—1 of Fig. 2, of an end of a spring shade roller showing the spear embodying my invention. Fig. 2 is a section on the line 2—2 of Fig. 1. Fig. 3 is a perspective view of the finished spear, showing it removed from the spindle, one end of which is shown. Fig. 4 is a perspective view of the blank from which the spear is made.

In all of the views like parts are designated by the same reference characters.

In carrying out my invention, I provide a spear 1, which is attached to the usual spindle 2, said spindle carrying the spring 3, and lying within the roller 4.

In Fig. 1 is shown the usual ferrule 5, cap 6, and pawls 7. The spear 1, instead of being made of malleable iron as has been customary heretofore, I prefer to make of sheet material, preferably sheet metal, stamped to the proper shape.

Fig. 4 represents the blank from which the spear is made. This blank comprises a tip 8, body 9, wings 10, 10, arms 11, 11, and tail 12. Between the wings and the arms are slits or cuts 13, at the bases of which are enlargements 14. Between the tail and the arms are slits 15.

Fig. 3 illustrates the spear with the parts bent to shape. One wing is bent to one side, and the other wing to the other. They are given a curved or partly cylindrical bend, as shown, producing the interrupted cylindrical surfaces 16. The width of each of these arms is such that the free edge 18 does not come down quite to the body, but leaves a slot 17 between the edge 18 of the wing and the body. This slot is for the introduction of the pawl (see Fig. 2). The body with the curved wings produces a substantially cylindrical projection which passes through the central opening of the cap and forms a bearing for the free end of the spindle when the shade is wound up by compressing the spring. The enlargements 14 permit of the ready bending to the final cylindrical form of the wings. The spear is placed on the end of the spindle, the legs straddling the same. The tail 12 is bent to one side, and forms an abutment to prevent the spear being driven too far upon the end of the spindle, and also to hold the spring in place and serves as a means to position the spear on the spindle. The spindle is provided with superimposed grooves 19, 19, with which the inner edges of the arms engage. These grooves may be made preliminarily to the introduction of the spear in place, or they may result from such introduction, the grooves being formed when the spear is driven in place. The end of the spindle is provided with a notch 20, at right angles to the grooves 19, 19, for the reception of the free end of the spring 3. The spear, and particularly the tail 12 will keep the spring steady in this notch. The tip 8 is of proper size and shape to engage with the bracket, in the usual manner. The sheet metal or other material of which the spear is made should be of sufficient stiffness and strength to prevent accidental bending.

In accordance with the provisions of the patent statutes, I have described the principle of my invention, together with the apparatus which I now consider to represent the best embodiment thereof, but I desire to have it understood that the apparatus shown is merely illustrative, and that the invention can be carried out in other ways.

Having now particularly described and ascertained the nature of my invention, and in what manner the same is to be performed, what I claim and desire to secure by Letters Patent is, 1. A sheet metal spear for shade roller spindles having a tip, cylindrically bent wings, and legs adapted to straddle the spindle; said tip and legs being in the same plane.

2. A sheet metal spear for shade roller spindles having a tip, cylindrically bent wings, legs adapted to straddle the spindle, and a tail adapted to position the spear on the spindle; said tip and legs being in the same plane and said tail being in a plane at right angles to the first named plane.

3. In combination, a spring; a shade roller spindle having a slit in the end thereof for the reception of an end of said spring; and a spear of sheet material having legs which lie in a common plane and straddle said spindle, and a tail which holds the spring in place.

4. A spear for shade rollers made of sheet metal and having a body portion; a tip extending therefrom in one direction; legs extending from said body portion in the opposite direction; said body portion, tip and legs being flat and in the same plane; and cylindrically bent wings extending from said body portion to form the bearing portion of the spear and the pawl notches.

This specification signed and witnessed this 24th day of June, 1910.

EDMUND F. HARTSHORN.

Witnesses:
R. STANSFIELD,
ALEX C. ADAMS.

Copies of this patent may be obtained for five cents each, by addressing the "Commissioner of Patents, Washington, D. C."